United States Patent [19]

Harlamoff et al.

[11] Patent Number: 5,594,592
[45] Date of Patent: Jan. 14, 1997

[54] NARROW LINEWIDTH BBO OPTICAL PARAMETRIC OSCILLATOR UTILIZING EXTRAORDINARY RESONANCE

[76] Inventors: Brian L. Harlamoff, 3490 Maplethorpe La., Soquel, Calif. 95073; James J. Jacob, 292 Dry Creek Rd., Aptos, Calif. 95003

[21] Appl. No.: 398,498

[22] Filed: Mar. 9, 1995

Related U.S. Application Data

[63] Continuation-in-part of Ser. No. 220,117, Mar. 30, 1994, Pat. No. 5,406,409.
[51] Int. Cl.$^6$ ........................................... G02F 1/39
[52] U.S. Cl. .............................. 359/330; 372/21
[58] Field of Search ..................... 385/122; 372/21, 372/22; 359/326–332

[56] References Cited

U.S. PATENT DOCUMENTS

| | | | |
|---|---|---|---|
| 3,670,258 | 6/1972 | Magnante | 359/328 |
| 4,784,450 | 11/1988 | Jain et al. | 359/332 |
| 5,033,057 | 7/1991 | Bosenberg et al. | 372/72 |
| 5,047,668 | 9/1991 | Bosenberg | 359/330 |
| 5,134,622 | 7/1992 | Deacon | 372/21 |
| 5,185,752 | 2/1993 | Welch et al. | 372/22 |
| 5,333,142 | 7/1994 | Scheps | 372/22 |
| 5,377,212 | 12/1994 | Tatsuno et al. | 372/22 |
| 5,394,412 | 2/1995 | Huignard et al. | 372/21 X |
| 5,406,409 | 4/1995 | Harlamoff et al. | 359/330 |
| 5,408,481 | 4/1995 | Scheps | 372/22 |

OTHER PUBLICATIONS

Burdulis et al., "Visible Optical Parametric Oscillation in Synchronously Pumped Beta–Barium Borate", *Optics Communications*, vol. 74, No. 6, pp. 398–402 (Jan. 15, 1990).
Brosnan, Stephen J. and Robert L. Byer, "Optical Parametric Oscillator Thresholdand Linewidth Studies," *IEEE Journal of Quantum Electronics*, vol. QE–15, No. 6, Jun. 1979, pp. 415–431.

*Primary Examiner*—John D. Lee
*Attorney, Agent, or Firm*—Majestic, Parsons, Siebert & Hsue

[57] ABSTRACT

Optical parametric oscillators using non-linear crystals cut for the type I interaction have an extraordinary pump beam which generates ordinary signal and idler beams. The use of an optical element to rotate the signal beam before sending this signal beam to a grating element allows for the grating element to have its dispersion plane oriented coplanar with the extraordinary crystal plane of the non-linear crystal. In this manner, for non-linear crystals which have relatively narrow acceptance angles, such as BBO crystals, the reduction in angular aperture of the parametric gain in the extraordinary plane will produce a reduction in the linewidth of the produced output. The grating translates the angular variations into variations in wavelength. If no rotator was used in the optical parameter oscillator, then in order to get the maximum efficiency out of the grating, the dispersion plane of the grating should be orthogonal to the extraordinary plane of the crystal, and therefore the narrow angular acceptance of the crystal would not result in a narrow output linewidth.

36 Claims, 7 Drawing Sheets

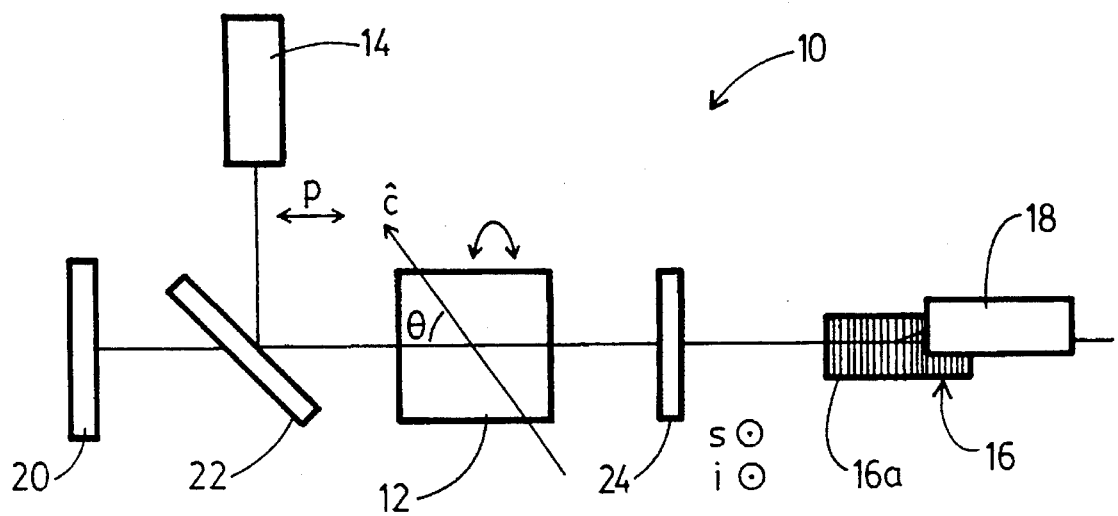
FIG._1.
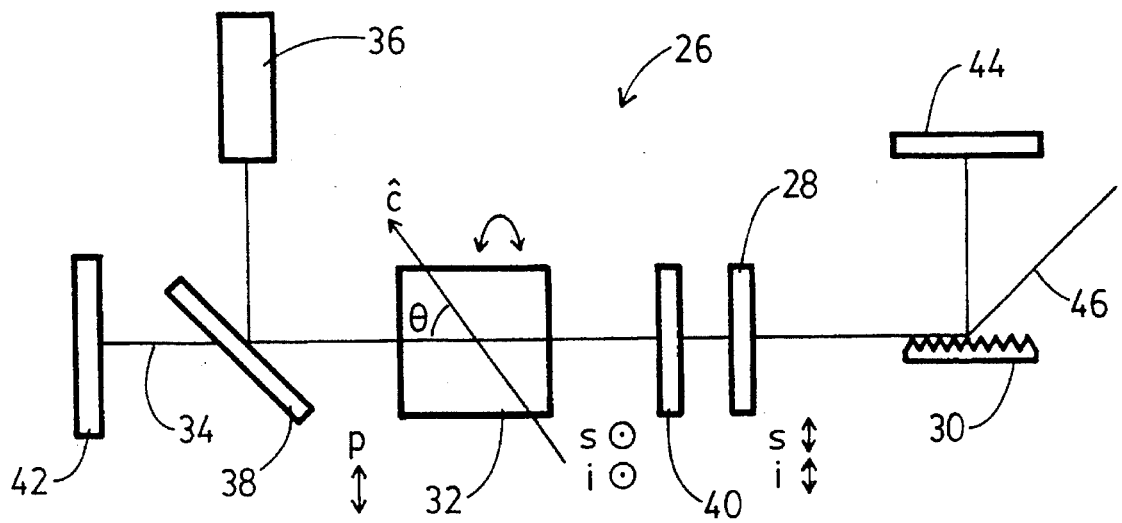
FIG._2.

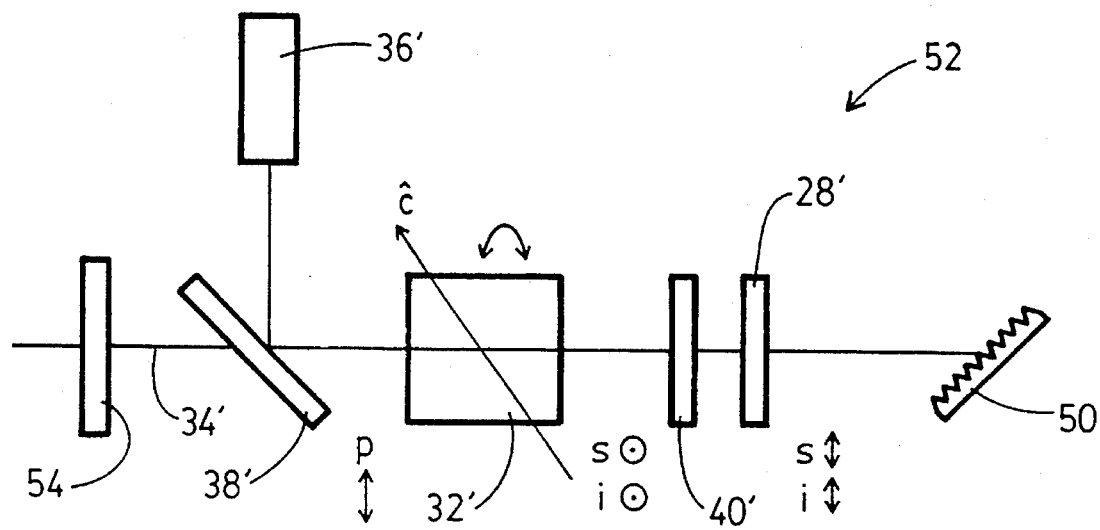
FIG._3.
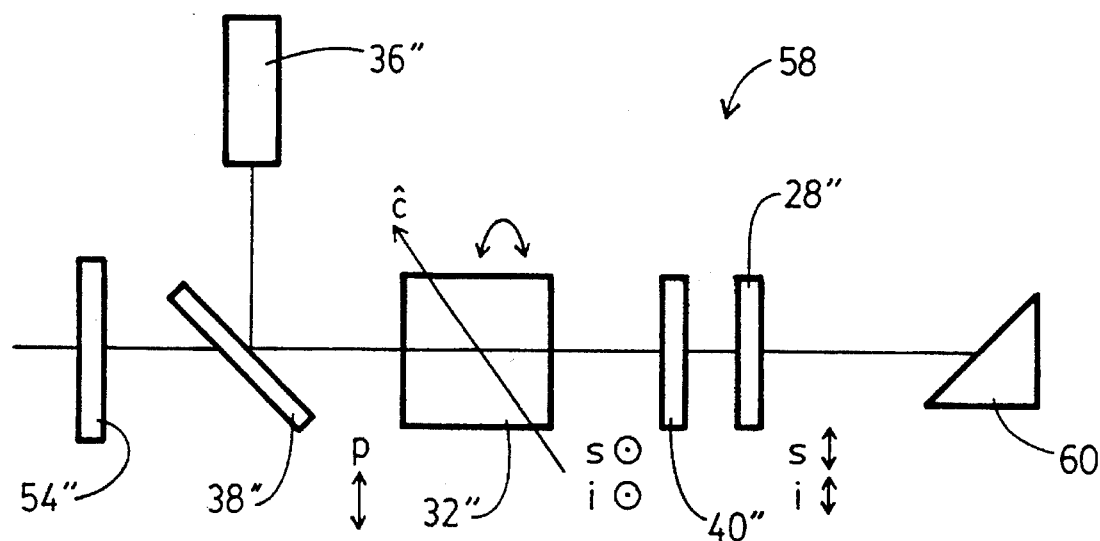
FIG._4.

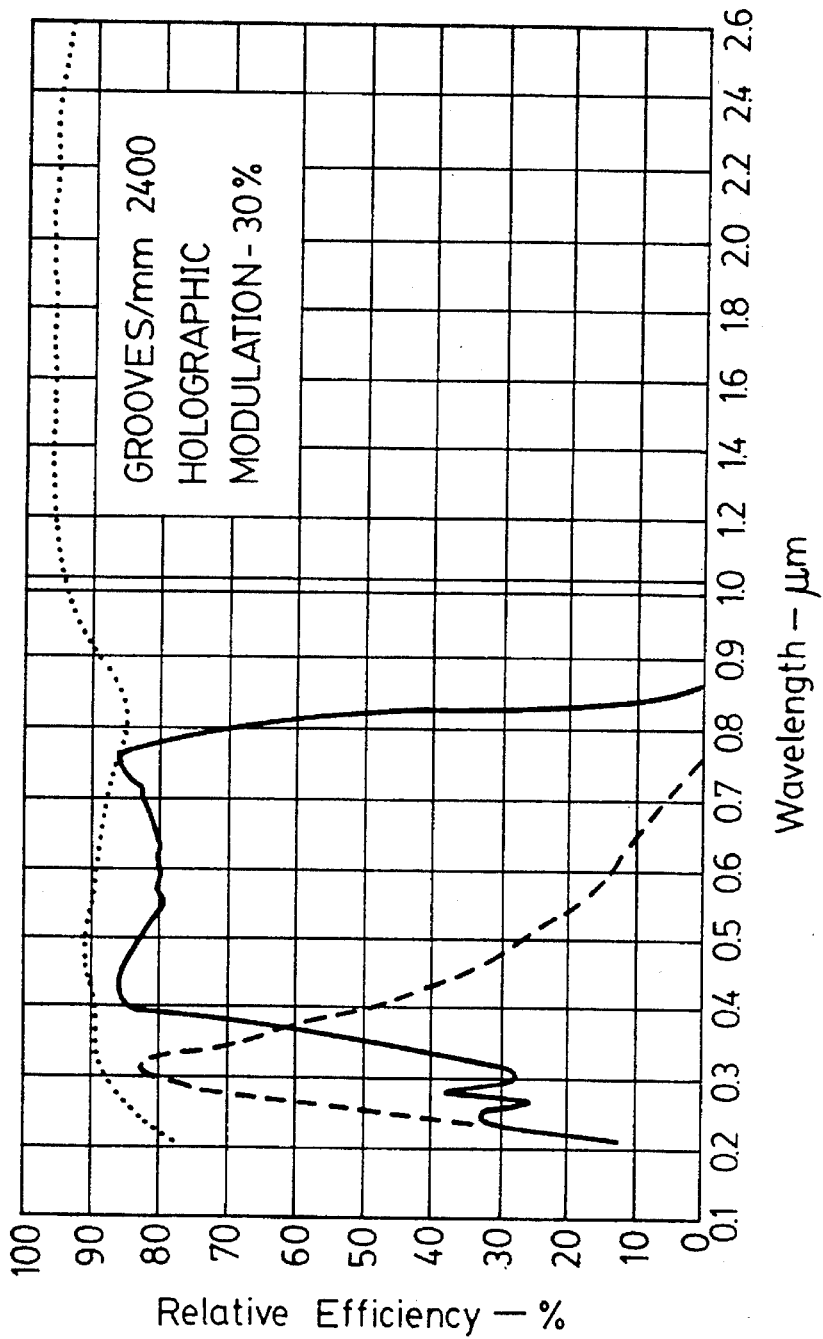
FIG._5.

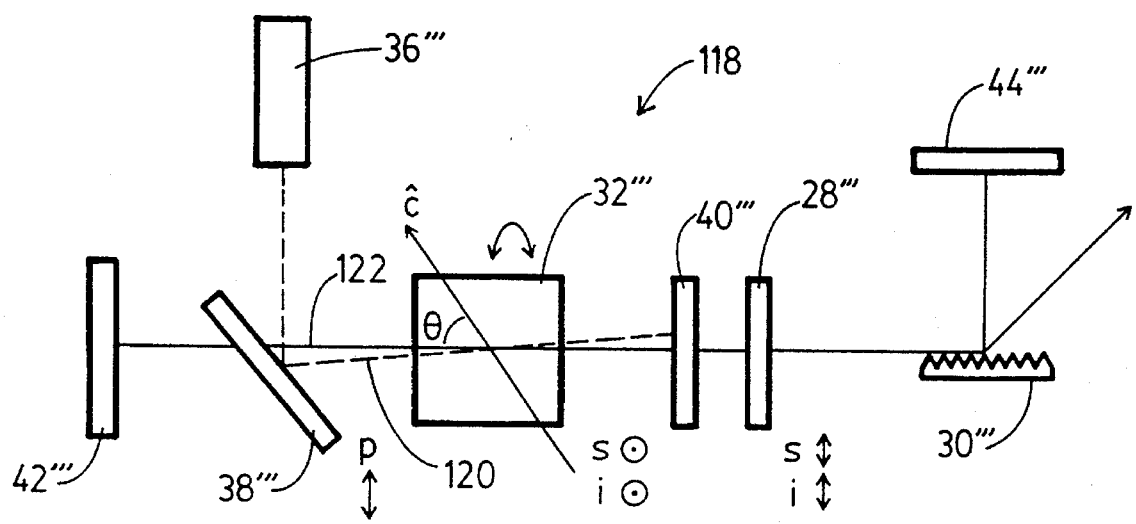
FIG._6.
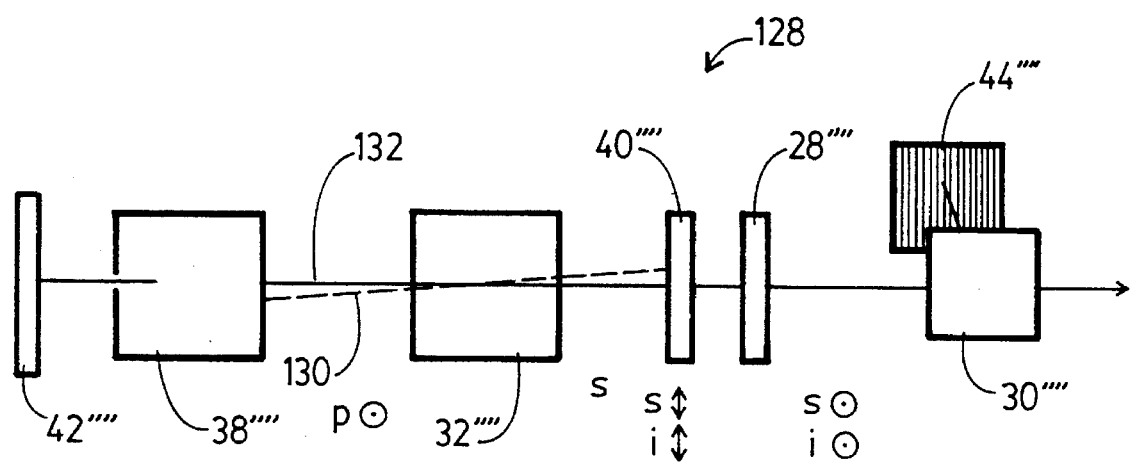
FIG._7.

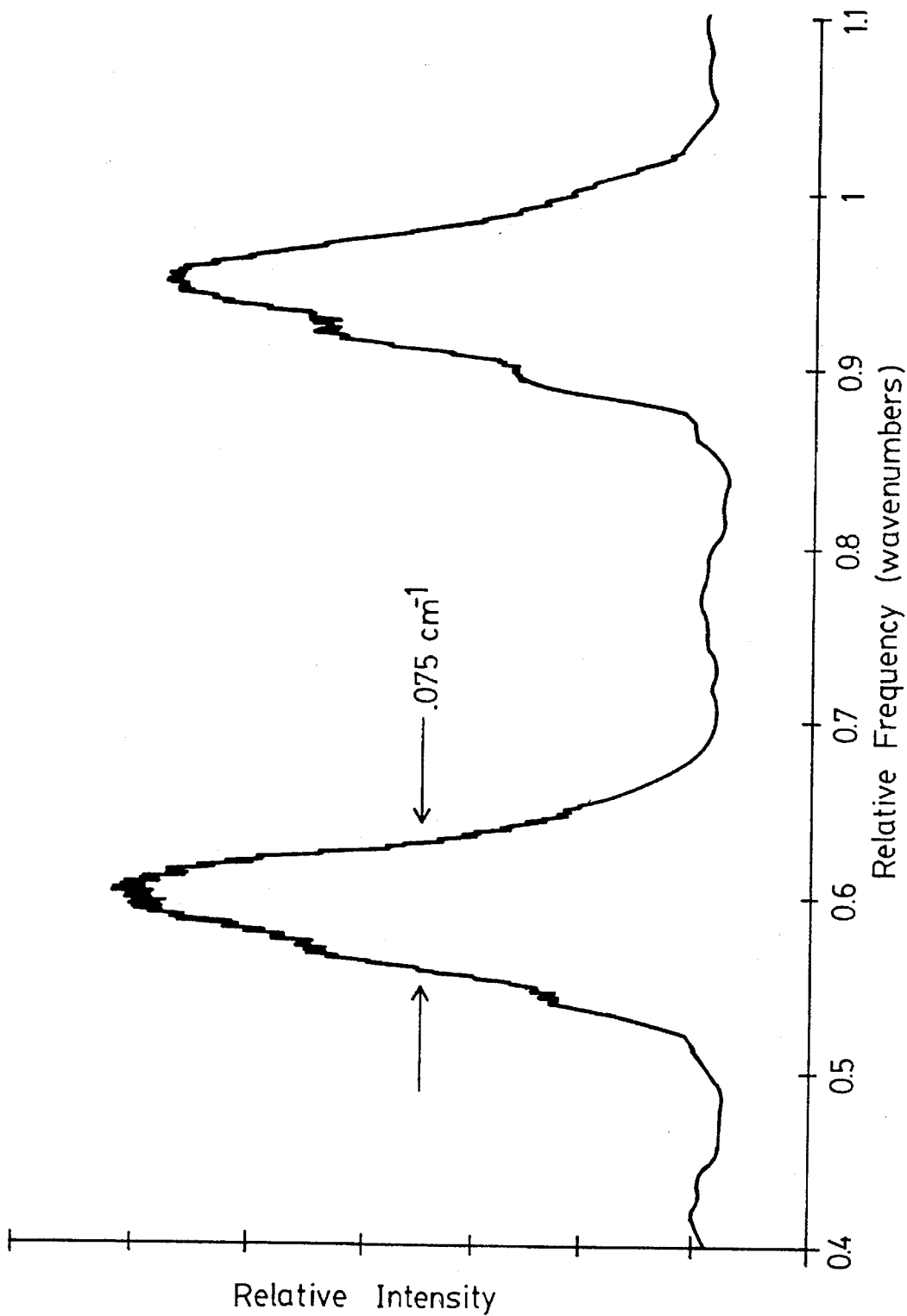
FIG._8.

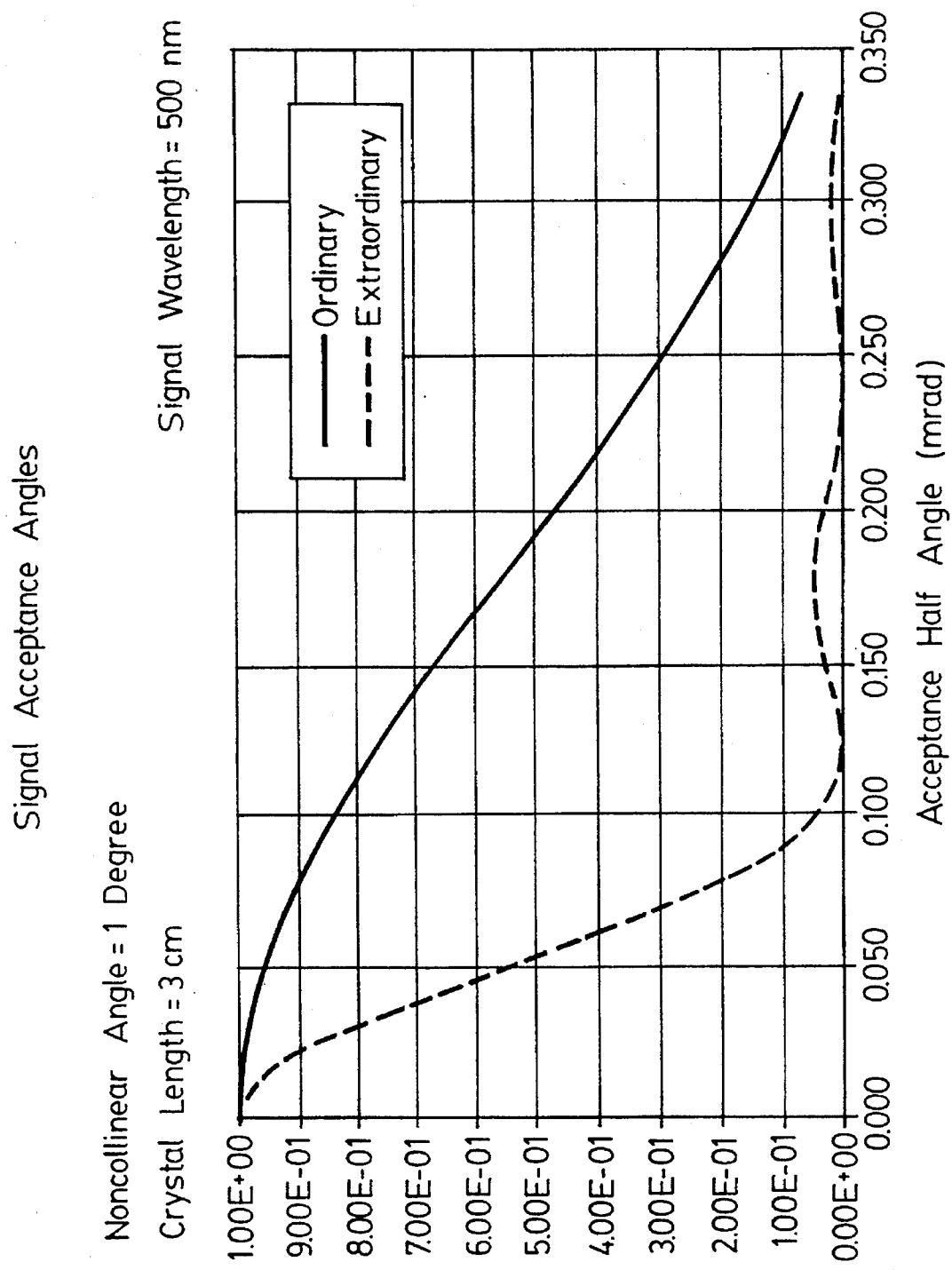
FIG._9.

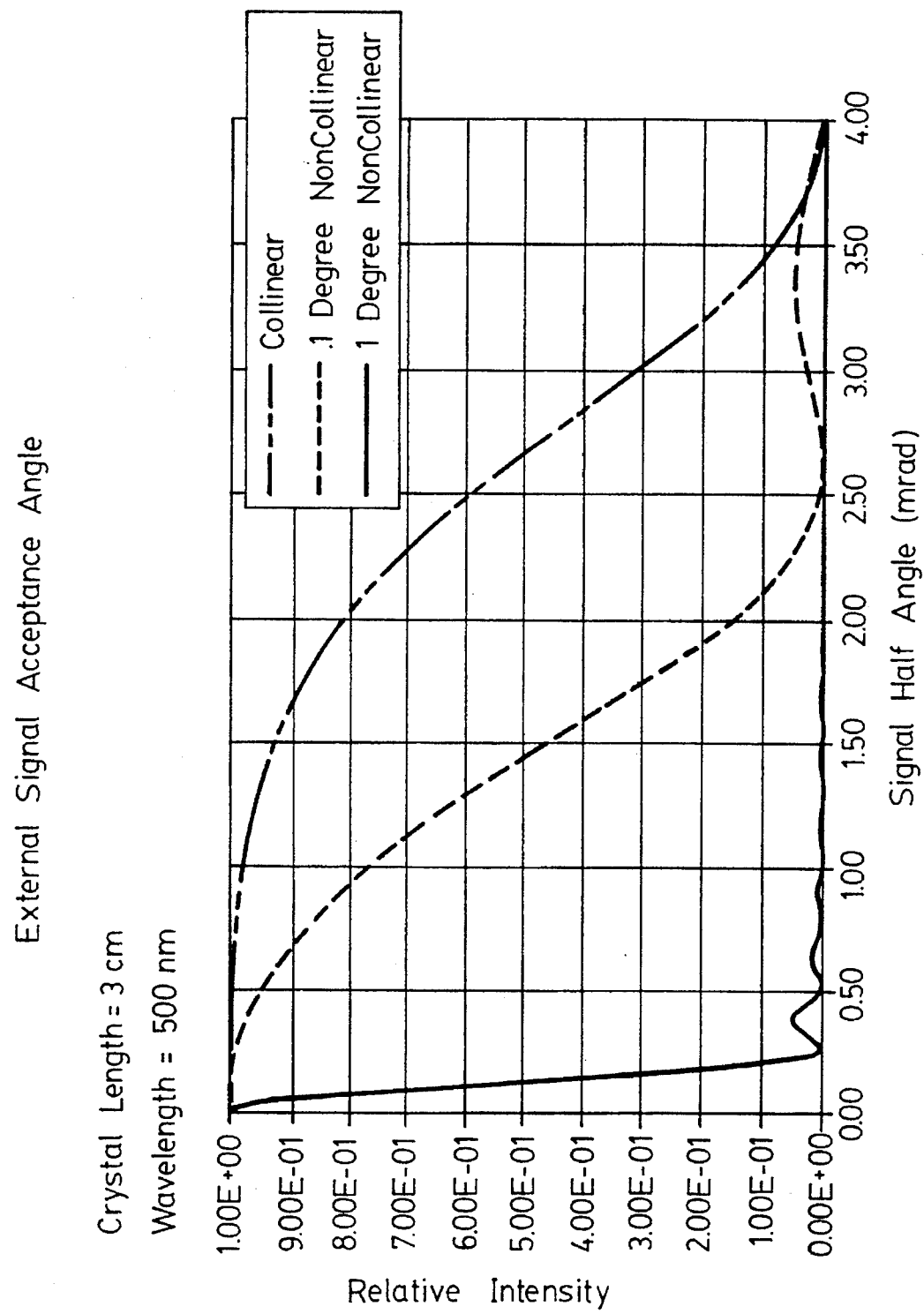
FIG._10.

NARROW LINEWIDTH BBO OPTICAL PARAMETRIC OSCILLATOR UTILIZING EXTRAORDINARY RESONANCE

CROSS REFERENCE TO RELATED APPLICATIONS

This is a continuation-in-part to U.S. patent application Ser. No. 08/220,117, entitled "Narrow Linewidth BBO Optical Parametric Oscillator Utilizing Extraordinary Resonance," filed on Mar. 30, 1994, now U.S. Pat. No. 5,406,409.

BACKGROUND OF THE INVENTION

This invention relates to optical parametric oscillators (OPOs). Optical parametric oscillators use nonlinear crystals in order to tune an output over a range of frequencies. The non-linear crystals are placed within a resonator and driven by an intense pump radiation to generate tunable monochromatic light. OPOs use a three-wave process in which the high-frequency pump $\omega_p$ is decomposed into a signal wave $\omega_s$, and an idler wave $\omega_i$. The relationship of the pump, signal, and idler is governed by the conservation of energy and momentum. Energy conservation requires that the sum of the generated energies, and therefore frequencies, equals that of the pump $\omega_p = \omega_s + \omega_i$. Momentum conservation is shown by the phase-matching relationship $k_p = k_s + k_i$. The values $k_p$, $k_s$ and $k_i$ are the momentum vectors for the pump, signal, and idler, respectively, and are related by the wavelength $\lambda$ of each wave by the relation $k = 2\Pi n/\lambda$, where n is the index of refraction.

In uniaxial birefringent crystals such as $\beta$-$BaB_2O_4$ (BBO), the index can either be ordinary or extraordinary ($n_o$ or $n_e$). If ordinary, the polarization vector of the light beam within the crystal is orthogonal to the optic axis of the crystal. In this plane, there is no angular relationship to the index. If extraordinary, the polarization vector of the light beam is in the plane of the optic axis, and therefore there is an angular relationship for the index. Momentum matching is achieved by rotating the crystal in the extraordinary plane, thereby varying the index and its associated k vector, of one of the light waves.

In many applications, it is desired that the output of the optical parametric oscillator have a narrow linewidth. Applications in spectroscopy and photochemistry may require linewidths of less than 0.1 cm$^{-1}$. Additionally, it is important that the optical parametric oscillator be efficient. This is especially true since some non-linear crystals such as BBO are typically pumped close to their damage threshold.

SUMMARY OF THE INVENTION

Gratings can be used to tune a beam such as the signal or idler which is fed back in the optical parametric oscillator. Angular variations of this beam translate into wavelength variations in the signal wave because of the grating dispersion.

The acceptance angle of the signal wave inside the crystal is defined as the half power divergence over which the signal wave will experience parametric gain. It is customarily a large angle in most cases. However, in BBO in the presence of a diverging pump wave and a non-collinear pump-signal geometry, the acceptance angle can be greatly reduced.

The present invention involves placing the dispersion plane of the grating in the extraordinary plane defined by the non-linear crystal so as to use the narrow acceptance angle of the signal wave to help narrow the linewidth of the output.

For type I interactions, an extraordinary pump beam produces ordinary signal and idler beams. In this configuration, it would not be obvious to arrange the grating such that its dispersion plane is in the extraordinary plane of the crystal. The grating has its greatest efficiency if the grating lines are perpendicular to the ordinary polarized signal beam. This causes the dispersion plane of the grating to be orthogonal to the extraordinary plane of the crystal.

For a type I interaction in the non-linear crystal, an embodiment of the present invention involves rotating the polarization of the signal beam from the ordinary to the extraordinary plane so that the grating has a high efficiency when it is aligned with its dispersion plane in the extraordinary plane defined by the non-linear crystal. In this manner, the grating is arranged with its grating lines orthogonal to the extraordinary plane so that the polarization of the ordinary product beam is perpendicular to the grating lines of the grating. The acceptance angle of the signal wave is reduced in the presence of a diverging pump wave in the extraordinary plane due to an added phase mismatch imposed by the angular variations of the index of refraction of the pump wave in the extraordinary planes. The use of noncollinear pumping adds to this effect. Non-collinear pumping reduces the acceptance angle of the signal wave in both crystal planes. In the extraordinary plane, the pump wave mismatch is added to the mismatch caused by non-collinear pumping.

Reducing the acceptance angle of the signal thereby reduces the linewidth since the grating resolution is directly proportional to the angular extent of the light that strikes it. In effect, the rotation of the product beam and orientation of the grating allows the angular filter effect of crystal to translate into a narrower linewidth.

Benefits can be obtained to a lesser extent by rotating the product beam away from the ordinary polarization, but not completely into the extraordinary plane when the grating lines are orthogonal to the extraordinary plane of the crystal. This partial rotation allows the product beam to be more perpendicular with respect to the grating lines than parallel. The optical element used to rotate the polarization of the ordinary beam may cause a rotation which depends upon the wavelength of the ordinary signal beam. Since the ordinary signal beam can be tuned by the optical parametric oscillator, the polarization vector of the ordinary signal beam may not be aligned completely into the extraordinary plane defined by the non-linear crystal.

The present system has benefits over the use of beam-expanding prisms in the optical parametric oscillator. In lasers, prism beam expanders have been used to obtain a narrow linewidth. The prism beam expander causes losses, however. Lasers can overcome this loss by being pumped harder. In optical parametric oscillators, some crystals, such as BBO crystals, are pumped close to their damage threshold. This means that any losses caused by the prism beam expanders will have to be offset by an increase in pump energy, thereby increasing the propensity for crystal damage.

BRIEF DESCRIPTION OF THE DRAWINGS

The above and other features and aspects of the present invention will become more apparent upon reading of the following detailed description in conjunction with the accompanying drawings, in which:

FIG. 1 is a diagrammatic view of an optical parametric oscillator without a rotator;

FIG. 2 is a diagrammatic view of an optical parametric oscillator with a rotator and diffraction grating;

FIG. 3 is a diagrammatic view of an optical parametric oscillator with a rotator and Littrow-mounted grating;

FIG. 4 is a diagrammatic view of an optical parametric oscillator with a rotator and Littrow prism;

FIG. 5 is a graph showing the grating efficiency versus wavelength for different polarizations;

FIG. 6 is a diagrammatic view of an optical parametric oscillator with a rotator and diffraction grating in which the pump is non-collinear with the optical path of the signal;

FIG. 7 is a side diagrammatic view of an alternate optical parametric oscillator with a rotator and diffraction grating in which the pump is non-collinear with the optical path of the signal;

FIG. 8 is a graph showing a averaged linewidth measurement of one hundred shots for a non-collinearly pumped optical parametric oscillator using extraordinary resonance;

FIG. 9 is a graph showing theoretical values for the ordinary and extraordinary acceptance angles of a non-linear crystal; and FIG. 10 is a graph showing the values for the half-angle phase synchronism for different non-collinear angles.

Similar elements among the different figures are labeled the same.

DETAILED DESCRIPTION OF THE PREFERRED EMBODIMENT

FIG. 1 is a diagrammatic view of an optical parametric oscillator 10 without a rotator. This optical parametric oscillator 10 has a non-linear crystal 12. For a type I interaction (eoo) in the optical parametric oscillator, the pump beam for the pump source 14 is polarized in the extraordinary plane of the non-linear crystal 12. The extraordinary plane of the non-linear crystal 12 is a plane of rotation of the optic axis c of the non-linear crystal 12, when the non-linear crystal 12 is rotated to be tuned at different angles. The signal and idler beams produced in the non-linear crystal 12 both have ordinary polarization so their polarization is orthogonal to the extraordinary plane of the crystal 12.

As shown in FIG. 1, the extraordinary plane of the crystal 12 is shown as a uniaxial crystal in which the index can be either ordinary or extraordinary. For the ordinary polarized beams, the signal and the idler, there is no angular relation to the index because the polarization of the light beam inside the crystal is orthogonal to the optic axis c of the crystal 12.

Rotating the crystal 12 in the extraordinary plane changes the angle θ between the direction of the propagation of the beams in the optical cavity and the optic axis c. Since in this situation the pump beam is polarized in the extraordinary plane, varying the angle θ varies the index $n_e$ and therefore varies the phase matching relationship, $k_p=k_s+k_i$.

The optical parametric oscillator 10 also uses a grating 16 and tuning mirror 18 to feed back a beam into the crystal 12. In the preferred embodiment, the signal beam is fed back into the crystal 12. By rotating the tuning mirror 18, the first order reflections off the grating 16 can be sent back along the axis of the optical parametric oscillator 10. The tuning mirror 18 and the rear mirror 20 define the cavity of the optical parametric oscillator 10. A signal beam will reflect between these two mirrors to seed the parametric interaction in the non-linear crystal 12. The non-linear crystal 12 and the tuning mirror 18 are both tuned in a manner that the desired signal beam resonates in the OPO 10. Zero order reflections off the grating 16 provide the output of the OPO 10.

The dispersion plane of the grating 16 is orthogonal to the extraordinary plane of the non-linear crystal 12. This orientation is used because the signal beam is polarized orthogonal to the extraordinary plane of the crystal. As shown in FIG. 5, for the relevant signal wavelengths, the range of around 410–710 nm, the grating is much more efficient if the input beam has its polarization perpendicular to the grating lines 16a of the grating 16. If the grating 16 is arranged with its grating lines perpendicular to the ordinary polarization of the signal beam, the dispersion plane is orthogonal to the extraordinary plane of the non-linear crystal 12.

The tuning mirror 18 is actually placed substantially on top of the grating 16. As shown in FIG. 1, the pump from the pump source 14 is sent through the non-linear crystal in two passes. The mirrors 22 and 24 are reflective for the pump beam wavelengths, and transmissive for the signal wavelengths. The pump beam reflects off the mirror 22 through the non-linear crystal 12 to the mirror 24 and then returns through the non-linear crystal and mirror 22 out back to the pump source 14. The signal beam passes through both mirrors 22 and 24 so that the signal beam resonates in the cavity formed between mirror 20 and tuning mirror 18. In this configuration, the OPO will provide a linewidth on the order of 0.25 cm$^{-1}$.

Achieving less than 0.1 cm$^{-1}$ linewidth in a low-loss resonator with only a single diffraction grating and no beam expander is possible by resonating the signal radiation in the extraordinary crystal plane. FIG. 2 is a diagrammatic view of an optical parametric oscillator 26 with a rotator 28 and diffraction grating 30. The non-linear crystal 32 is cut for the type I interaction where an extraordinary pump is converted to an ordinary signal and idler beams. This means that the polarization of the pump coming into the non-linear crystal 32 is in the extraordinary plane, and the polarization of the signal in the idler beams produced have an ordinary polarization. The ordinary polarization has a polarization vector which is orthogonal to the extraordinary plane defined in the non-linear crystal 32.

The rotator 28 rotates the polarization of the signal and idler beams such that preferably the polarization of the signal beam is rotated into the extraordinary plane. The diffraction grating 30 is arranged such that its dispersion plane is in the extraordinary plane defined by the crystal 32. The grating 30 has grating lines perpendicular to the extraordinary plane of the non-linear crystal. This means that the rotated polarization of the signal and idler beams are perpendicular to the grating lines of the grating 30. For this reason, the grating 30 will have a high efficiency.

FIG. 5 shows the grating efficiency versus wavelength for different polarization orientations of a 2400 lines/mm holographic grating. As shown, the perpendicular polarization has a high efficiency in the range of about 410 nm to 710 nm. By rotating the polarization of the signal beam, the high efficiency perpendicular orientation with respect to the grating lines can be used at the same time that the dispersion plane of the grating is in the extraordinary plane defined by the crystal 32.

Alternate embodiments for the optical element 28 which is used to rotate the polarization of the signal beams could be a zero order half-wave plate, a 90° polarization rotator, or a quartz beam rotator.

As described below, a non-linear crystal 32 with a narrow pump beam acceptance angle, such as a BBO crystal cut for type I interactions, reduces the angular aperture for signal parametric gain in the extraordinary plane in the presence of a diverging pump beam. This reduction of angular aperture acts an angular filter which reduces the angular variation about the cavity axis in the extraordinary plane at the grating 30 and thus reduces the wavelength variation of the signal beam.

The phase matching criteria is given as $k_p=k_s+k_i$. The phase mismatch is a perturbation of the exact phase-matching and can be denoted as $k_p=k_s+k_i+\Delta k$. The FWHM of the phase synchronism expressed for a crystal of length L can be converted into an angle by realizing that $\Delta k$ can be expressed in terms of index change for the pump and consequently an angular change for the pump beam. Equations for the $\Delta k_{nc}$ attributable to the noncollinear pumping effect, the $\Delta k_{diverge}$ attributable to the pump beam divergence, and the $\Delta k_{total}$, are given as equations 9–12.

The present invention can also be used for type II interaction (eoe interaction) wherein the feedback beam is the ordinary polarized beam. The BBO cut for type II interaction does not have quite as narrow an acceptance angle, so the linewidth narrowing benefits would not be as great.

Looking again at FIG. 2, the OPO 26 has a pump source 36 that preferably provides a 355 nm pump radiation directed into the non-linear crystal 32 by the 45° turning mirror 38, which is a high reflector for the 355 nm pump radiation and a high transmitter for the 410–710 nm signal radiation. The non-linear crystal 32 is rotated by an angle θ from the optic or c axis of the crystal 32 to the cavity axis 34 of the OPO 26. The plane of rotation of the crystal 32 is referred to as the extraordinary crystal plane of the non-linear crystal 32. Rotating the non-linear crystal 32 in the extraordinary plane does not affect the index seen by ordinary waves, which have their polarization orthogonal to the extraordinary plane.

Mirror 40 is a zero degree dichroic that retroreflects the pump radiation and transmits the signal radiation. The pump beam creates parametric fluorescence in the crystal 32 and successively amplifies the resonated signal in this crystal during the pump pulse duration. The resultant signal is resonated between the rear cavity mirror 42 and the tuning mirror 44, both of which are broad band high reflectors from 410–710 nm.

The signal is filtered spectrally twice on each pass by the first order reflection from the grating 30. This grating 30 serves to output couple the signal radiation from the zero order reflection along 46. A preferred grating ruling density for narrow linewidth is 2400 lines/mm and the preferred angle of incidence is 88.5°. In the preferred embodiment, the optical element 28 is a zero order wave plate inserted between the grating 30 and the pump retro-reflector 40. This waveplate 28 rotates by 90° the signal polarization vector from the ordinary crystal plane to the extraordinary plane of the crystal. The signal beam returning from the grating is rotated back into the ordinary plane by the waveplate 28.

In the preferred embodiment, the non-linear crystal is a uniaxial BBO crystal cut for type I interaction. The BBO crystal is available from Crystal Technology, Inc. located in Palo Alto, Calif. The dichroic mirrors, retro-reflectors, rear mirror, and zero order waveplate are available from CVI, located in Albuquerque, N. Mex. The grating is available from Instruments SA, Edison, N.J. The tuning mirror is available from Newport Corp. located in Fountain Valley, Calif. The pump laser is available from Continuum of Santa Clara, Calif., or Spectra Physics Lasers of Mountain View., Calif.

FIG. 3 is a diagrammatic view of an OPO with a rotator 28' and Littrow-mounted grating 50. This embodiment is similar to the embodiment shown in FIG. 2; however, a Littrow-mounted grating 50 returns a diffraction order back to the OPO 52 and a partially transmissive mirror 54 produces the output signal. In this case as well, the rotator 28' rotates the orientation of the signal beams from the polarization orthogonal to the extraordinary axis to a polarization in the extraordinary axis, so that the dispersion plane of the grating 50 is in the extraordinary plane of the non-linear crystal 32'. The grating lines of the Littrow-mounted grating 50 are orthogonal to the polarizations of the signal beam, so that the efficiency of the Littrow-mounted grating 50 is optimized. The linewidth of the OPO 52 with the Littrow-mounted grating is not as narrow as the linewidth of OPO 26 described in FIG. 2. However, looking again at FIG. 3, in this configuration, the narrow acceptance angle in the extraordinary crystal plane of the crystal 32' can be used to narrow the linewidth from the other orientation of the grating. The Littrow grating is available from Instruments SA, of Edison, N.J. The transmitting mirror is available from CVI of Albuquerque, N. Mex.

FIG. 4 is a diagrammatic view of an optical parametric oscillator with a rotator 28" and a Littrow prism 60. The Littrow prism 60 is another embodiment for returning a diffraction order of the signal beam into the OPO 58. The Littrow prism is available from CVI of Albuquerque, N. Mex.

Looking again at FIG. 2, the rotator 28 does not have to rotate the signal beam exactly 90° over the entire wavelength range of the signal wavelength. A zero order waveplate 28 can be set to rotate by 90° the polarization of a center wavelength (i.e. 600 nm) of a 410–710 nm signal output range. Signals with a wavelength at either end of the output range would not have exactly a 90° rotation, so the signal beam sent to the grating 30 would not necessarily be polarized in the extraordinary plane of the non-linear crystal 32. The polarization would have a relatively large component in this plane, however, so that the grating 30 could be somewhat efficient.

Additionally, it would be theoretically possible that the dispersion plane of the grating 30 be oriented at an orientation that is not orthogonal to the extraordinary plane of the crystal 32, yet not in the extraordinary plane. If the signal beam's polarization were rotated for the grating's optimum efficiency, the grating's orientation would allow a partial linewidth narrowing effect as a result of the narrow acceptance angle of the non-linear crystal 32 in the extraordinary plane. This partial effect is less than if the dispersion plane of the grating was coplanar with the extraordinary plane of the crystal 32.

The narrowing effect is partly caused by the non-collinear pumping of the non-linear crystal. Non-collinear pumping is described in Guyer et al., "Tunable Pulsed Single Longitudinal Mode Optical Parametric Oscillator," U.S. Pat. No. 5,235,456, which is incorporated herein by reference.

A benefit of non-collinearly pumping the non-linear crystal is that the pump wave walk off from the signal wave is somewhat compensated. Non-collinear pumping also reduces the signal acceptance angle which is defined as the angular FWHM of the phase synchronism for the signal with a planar pump wave. For collinear phasematching, the external signal acceptance angle is on the order of 6 milliradians. This assumes an interaction length of 3 cm which is realized in our system by the bidirectional pumping of the 1.5 cm crystal. As the non-collinear angle is increased, the signal acceptance angle decreases. FIG. 10 is a theoretical graph of the half-angle phase synchronism for different non-collinear angles.

FIG. 6 is a diagrammatic view of an optical parametric oscillator 118 with a rotator 28''' and diffraction grating 30''' in which the pump path 120 is non-collinear with the optical path 122 of the signal. Dichroic mirrors 38''' and 40''' are tilted slightly off of the orientations in FIG. 2 so that the pump path 120 is non-collinear with the optical path 122 of the signal. The signal beam is not significantly affected by this tilt, since mirrors 38''' and 40''' are transmissive to the signal wavelength.

FIG. 7 is a side diagrammatic view of an optical parametric oscillator 128 with a rotator 28'''' and diffraction grating 30'''' in which the pump path 130 is non-collinear with the optical path 132 of the signal. This is the preferred non-collinear orientation in which the pump beam moves out of the extraordinary plane of the non-linear crystal 32''''. In FIG. 7, the extraordinary plane of the non-linear crystal 32'''' is orthogonal to the figure plane. In a preferred embodiment, the pump beam is 0.5° to 3.0° off of the extraordinary plane of the non-linear crystal.

With a one degree non-collinear angle, the external signal acceptance angle is reduced to less than 500 microradians. The diffraction and aperture angles when convolved with the acceptance angle are limited by this angular filtering provided by the crystal. This then reduces the linewidth. For example, at 543 nm with the cavity described above, our pump waist was 1.5 mm and our corresponding signal waist was around 0.36 mm. The pump was approximately 7.0 ns in duration (FWHM). The output pulse measured 3.0 ns, which gave us a 4.0 ns oscillator rise time (pump pulse duration minus output pulse duration). The diffraction angle for this case is calculated to be 430 microradians and the aperture angle 278 microradians. Our calculations show that if we used collinear pumping, the linewidth would be 0.29 cm$^{-1}$ without extraordinary resonance. The one degree non-collinear pumping geometry reduces the linewidth to a theoretical value of 0.24 cm$^{-1}$ without extraordinary resonance. Our experimental linewidth measured 0.25 cm$^{-1}$ without extraordinary resonance (Table A, Experiment 1).

The extraordinary resonance using the rotator 28'''' and the orientation of the diffraction grating 30'''', as described above with respect to FIG. 2 and as shown in FIG. 7, the linewidth can further narrowed. The non-linear crystal 32'''' is oriented such that the cavity is resonated in the extraordinary crystal plane (the grating dispersion plane is then coplanar with the extraordinary crystal plane). As discussed above, the zero order half wave plate between the crystal 28'''' and grating 30'''' rotates the polarization vector of the signal wave so that its orientation was correct for high grating diffraction efficiency, yet remained an ordinary wave when propagating through the crystal 28''''. Throughout the tuning range, the linewidth is less than 0.1 cm$^{-1}$. The advantages of this system include producing a narrow linewidth in a simple cavity. Additionally, the non-linear crystal can be pumped at a safe operating level.

Table A shows the experimental results with the OPOs. These results use non-collinear pumping. The oscillator for all six experiments was 15 cm long and included a high reflector, a 15 mm BBO crystal, a 2400 lines/mm diffraction grating and tuning mirror. The BBO is pumped bi-directionally, which effectively increases the interaction length in the crystal thereby lowering the oscillation threshold of the OPO. The OPO is typically pumped with 60 mj of 355 nm energy and extract approximately 2 to 3 millijoules off the zero order grating reflection.

Experiment 1 without extraordinary resonance produces a measured linewidth of 0.25 cm$^{-1}$. In experiment 2, a six-prism beam expander was added. The six-prism beam expander provided a magnification of 11 and increased the cavity length to 30 cm. The grating angle of incidence was changed to 84.75 degrees to overcome the additional losses imposed by reflections off the prisms and the increase in threshold due to added cavity length. The pump spotsize and signal spotsize were 1.5 mm and 0.48 mm respectively. The linewidth did reduce to a measured value of 0.07 cm$^{-1}$. The calculated diffraction angle is 34 microradians and the aperture angle is 44 microradians yielding a modeled value of 0.08 cm$^{-1}$. When the expander is used, the diffraction and aperture angles are reduced by the magnification of the prisms to values much lower than the crystal acceptance angle, so the crystal interaction has little effect in this case. One problem with using a beam expander is that the output beam size is increased in the plane of expansion since the output coupling takes place off the zero order grating reflection. Another disadvantage of the beam expander is that the pump energy has to be increased to a level that can damage the crystal and intracavity optics. The pump level increase for this case was up to 50 percent higher than the cases without the expander.

Experiments 3–6 in Table A show our results for the extraordinary resonance. The linewidth was narrowed by at least a factor of three from the first grazing incidence grating configuration (Experiment 1). Throughout the tuning range, the linewidth is less than 0.1 cm$^{-1}$. FIG. 8 shows a typical averaged linewidth measurement of one hundred shots. By using extraordinary resonance, a narrow linewidth can be produced in a simple cavity in which the crystal can be pumped at a safe operating level.

We now will discuss our analysis of this oscillator. If the angular aperture of the parametric gain of the signal is restricted to a value less than that of the ordinary resonant system, there will be a further reduction in linewidth. As mentioned earlier, the non-collinear pump geometry reduces the signal acceptance angle, thus, the linewidth. This reduction of the signal acceptance angle is isotropic assuming a plane pump wave, because in the type 1 interaction the signal is an ordinary wave. The signal k-vector simply rotates symmetrically around the pump k-vector. This would imply that non-collinear pumping in either the ordinary or extraordinary plane would equally reduce the linewidth over collinear pumping. However, since the pump beam is not a plane wave, the acceptance angle is further reduced in the extraordinary plane because there is an added phase mismatch $\Delta k$ due to the angular dispersion of the index of the pump, $\partial n_3(\theta)/\partial \theta$. In particular, BBO has a high $\partial n_3(\theta)/\partial \theta$ such that the divergence of the pump beam will effectively reduce the angular aperture. In FIG. 9, we plot the theoretical values for the ordinary and extraordinary acceptance angles. The diffraction and cavity angles are thus assumed to be limited further in the extraordinary plane by this additional phase mismatch. In the ordinary plane, $\partial n_3(\theta)/\partial \theta$ is equal to zero so the diverging pump does not reduce the signal acceptance angle. It then is critical in which orientation the crystal is with respect to the tangential system plane (the plane of grating dispersion) for narrow linewidth operation.

In summary, the parametric signal gain is constricted to a narrow acceptance angle through a combination of non-collinear pumping and the intrinsic high angular dispersion of the extraordinary wave in BBO.

The model of the optical parametric oscillator utilizing extraordinary resonance discussed below assumes that the linewidth narrowing effect is due to the combination of the extraordinary resonance and the non-collinear pumping.

This model is an adaptation of the Littrow grating resonator analysis of Brosnan and Byer, *IEEE Journal of Quantum Electronics*, Vol. 15, p.415, incorporated herein by reference. That analysis has been modified to accommodate grazing incident grating resonator configurations. We first calculate the diffraction and aperture angles defined in the text, and then the linewidth of the OPO. We then consider the line narrowing effects of the crystal phasematching properties, namely, non-collinear pumping and pump beam divergence.

The diffraction angle is given as:

$$\Delta\alpha_d = [4L\lambda_s/\Pi w_s^2]^{1/3} \lambda_s/M \, \Pi w_s \quad (1)$$

where $\lambda_s$ is the signal wavelength, M is the magnification of the beam expander, L is the cavity length, and $w_s$ is the resonated spot size. This resonated spot size is typically 20 to 30 percent of the pump waist. The dispersion of the grating is:

$$d\lambda_s/d\alpha = \lambda_s(\cos\alpha)/(\sin\alpha + \sin\beta) \quad (2)$$

where $\alpha$ is the incident grating angle and $\beta$ is the diffracted angle. For the Moya grating arrangement (FIGS. 2, 6 and 7), we have to account for the increased dispersion due to multiple reflections off the grating. The term r is the number of grating reflections per cavity round trip and is equal to 2 for grazing incidence grating configurations. Setting $d\alpha$ equal to $\Delta\alpha_d$ the FWHM diffraction linewidth in wavenumbers is then given as:

$$\Delta v_D = (2\ln 2)^{1/2} (d\lambda_s/d\alpha)(1/r)(1/\lambda_s^2)(\Delta\alpha_d) \quad (3)$$

The aperture term comes from considering the pump waist and the rays that are reflected from the grating back through the pump volume. These rays are composed of off-resonant wavelengths which are amplified in the gain medium. For a given shift in wavelength $\Delta\lambda$ from the resonated wavelength, the qth grating reflection angle $\Delta\alpha_q$ from the resonator axis is:

$$\Delta\alpha_q = (n\Delta\lambda/\cos\alpha)q \quad (4)$$

The pump waist $w_p$ sets the aperture width for the gain of the off-axis wavelength shift. For a given pump waist, cavity length, and magnification, there is an initial cavity grating reflection angle (q=1) that remains within the gain region over the summation of multiple grating passes. This we call the aperture angle:

$$\Delta\alpha_1 = \Delta\alpha_a = 2w_p/M\,L\,p(p+1) \quad (5)$$

where p is the number of grating passes during the OPO rise time $\tau$ and is equal to $c\tau/2L$. Note again that r equals two because there are two grating reflections per round trip for a Moya oscillator. The rise time is roughly equal to the pump pulse duration minus the OPO pulsewidth. The aperture angle can be expressed in terms of the grating parameters if we set q=1 in Equation 4:

$$\Delta\alpha_a = (n\Delta\lambda/\cos\alpha) \quad (6)$$

By rearranging the terms in (6), the FWHM aperture linewidth in wavenumbers can be expressed as follows:

$$\Delta v_A = (2\ln 2)^{1/2}(\cos\alpha/n)(1/\lambda_s^2)(\Delta\alpha_a) \quad (7)$$

The total grating narrowed OPO linewidth is thus the sum of the diffraction and aperture terms:

$$\Delta v_G = \Delta v_D + \Delta v_A \quad (8)$$

The linewidth can be reduced further by gain restriction of the diffraction and aperture angles. This is accomplished by reducing the acceptance angle of the signal such that the angular parametric gain of the crystal effectively limits the diffraction and aperture angles. The acceptance angle can be reduced in two ways: (1) if the crystal is pumped in a non-collinear geometry, the signal acceptance angle will be reduced; and (2) the signal acceptance angle in the extraordinary plane will be reduced in the presence of a diverging pump wave.

First, the non-collinear effect is calculated by solving a simple geometric expression for the non-collinear interaction. The k vectors for the pump, signal, and idler are phasematched when:

$$k_p^2 + k_s^2 - 2k_p k_s \cos\phi = k_i^2 \quad (9)$$

where $\phi$ is the non-collinear angle between the signal and pump. A phase mismatch ($\Delta k$) will occur when the non-collinear angle is changed by a $\Delta\phi$, assuming everything else is fixed. Therefore, the mismatch associated with an angular change in the signal is:

$$\Delta k_{NC} = [k_p^2 + k_s^2 - 2k_p k_s \cos(\phi + \Delta\phi)]^{1/2} - k_i \quad (10)$$

The pump beam divergence adds another phase mismatch term in the extraordinary plane.

$$\Delta k_{Diverge} = \frac{2\pi}{\lambda_3} \frac{\partial n_3(\theta)}{\partial\theta} \Delta\theta \quad (11)$$

where $\Delta\theta$ is the angular deviation in the pump beam from the exact phasematched crystal angle and $\lambda_3$ is the pump wavelength. The term $\partial n_3(\theta)/\partial\theta$ is the change in index of the pump wave with respect to the change in angle in the extraordinary plane and is equal to zero in the ordinary plane.

The total mismatch is the sum of both terms:

$$\Delta k_{Total} = \Delta k_{NC} + \Delta k_{Diverge} \quad (12)$$

Therefore, in the extraordinary plane there is an additional narrowing of the acceptance angle due to the divergence of the pump beam. The signal acceptance angle is calculated numerically by varying both $\Delta\phi$ and $\Delta\theta$ equally and summing the two mismatches for each angular increment. The phase synchronism expression is at a half power point when:

$$\Delta k_{Total} L = 2\Pi \quad (13)$$

where L is the crystal length.

In all laser systems, the pump beam has a finite divergence. If the angular rate of change of the index of refraction of the extraordinary pump wave is large, then the momentum mismatch ($\Delta k$) will be significant. Usually, a momentum mismatch is not desired because it inhibits the gain; however, if the nonlinear drive of the material is high enough, then some gain can be sacrificed if the angular spectrum is reduced enough to limit the linewidth of the system.

To calculate the total OPO linewidth in the case non-collinear pumping and beam divergence the diffraction and aperture angles are convolved with both the extraordinary and ordinary signal acceptance angles to arrive at system linewidths for both the ordinary and extraordinary cases.

Various details of the implementation and method are merely illustrative of the invention. It will be understood that various changes of details may be within the scope of the invention, which is to be limited only by the appended claims.

TABLE A

| | Experiment | | | | | |
|---|---|---|---|---|---|---|
| | 1 | 2 | 3 | 4 | 5 | 6 |
| Polarization | o wave | o wave | e wave | e wave | e wave | e wave |
| Grating | Single 2400 | Single 2400 | Single 2400 | Single 2400 | Single 2400 | Single 2400 |
| Beam Expander | none | 6 prism | none | none | none | none |
| Cavity Length (cm) | 15 | 30 | 15 | 15 | 15 | 15 |
| Alpha (deg) | 88 | 84.75 | 88.4 | 88.4 | 88.4 | 88.4 |
| Wavelength (nm) | 543 | 594 | 480 | 500 | 600 | 700 |
| Pump spotsize (cm) | 0.15 | 0.15 | 0.15 | 0.15 | 0.15 | 0.15 |
| Signal spotsize (cm) | 0.036 | 0.048 | 0.036 | 0.036 | 0.036 | 0.036 |
| Diffraction Angle (microrad) | 430 | 34 | 380 | 400 | 510 | 630 |
| Aperture Angle (microrad) | 278 | 44 | 278 | 278 | 278 | 278 |
| Acceptance Angle (microrad) | 536 | 668 | 108 | 111 | 120 | 127 |
| Measured Linewidth (cm-1) | 0.25 | 0.07 | 0.08 | 0.08 | 0.08 | 0.04 |
| Modeled Linewidth (cm-1) | 0.24 | 0.08 | 0.09 | 0.09 | 0.06 | 0.05 |

What is claimed is:

1. An optical parametric oscillator comprising:

an optical cavity defined between two reflective elements;

a non-linear optical crystal having an extraordinary plane, said non-linear crystal located in the optical cavity and adapted to generate a product beam of ordinary polarization in response to a pump beam of extraordinary polarization, said product beam having a different wavelength from the pump beam;

a grating in said optical cavity, said grating aligned so that the dispersion plane of the grating is not orthogonal to the extraordinary plane of the non-linear crystal; and an optical element in the optical cavity adapted to rotate the polarization of the product beam from the ordinary polarization, wherein the optical cavity is aligned such that the pump beam and product beam are non-collinear.

2. The optical parametric oscillator of claim 1, further comprising mirrors in the optical cavity that are substantially reflective for the pump beam wavelengths and substantially transmissive for the product beam wavelength.

3. The optical parametric oscillator of claim 2, wherein said mirrors are arranged Such that the pump beam is 0.5° to 3.0° off of the extraordinary plane of the non-linear crystal.

4. The optical parametric oscillator of claim 1, wherein the grating is aligned so that the dispersion plane of the grating is substantially coplanar with the extraordinary plane of the non-linear crystal.

5. The optical parametric oscillator of claim 4, wherein the optical element in the optical cavity is adapted to rotate the polarization vector of the product beam from the ordinary polarization to substantially the extraordinary crystal polarization plane.

6. The optical parametric oscillator of claim 1, wherein the optical element is a zero order half wave-plate.

7. The optical parametric oscillator of claim 6, wherein the zero order half waveplate is a 90 degree polarization rotator over a product beam wavelength tuning range.

8. The optical parametric oscillator of claim 1, wherein the optical element is a beam rotator.

9. The optical parametric oscillator of claim 1, wherein said product beam is the signal beam of the non-linear crystal.

10. The optical parametric oscillator of claim 1, wherein said product beam is the idler beam of the non-linear crystal.

11. The optical parametric oscillator of claim 1, wherein said grating is a diffraction grating and wherein said reflective elements comprise a rear mirror and a tuning mirror in the dispersion plane of the diffraction grating, said diffraction grating dispersing the product beams into different orders, one of the orders being an output and the tuning mirror arranged to reflect another of the orders back toward the non-linear crystal.

12. The optical parametric oscillator of claim 1, wherein the non-linear crystal is cut for the TYPE I interaction.

13. The optical parametric oscillator of claim 1, wherein the non-linear crystal has a narrow acceptance angle in the extraordinary plane.

14. The optical parametric oscillator of claim 13, wherein the non-linear crystal is a BBO crystal.

15. The optical parametric oscillator of claim 1, further comprising a mirror in said cavity that is a high transmitter of the pump beam and a high reflector of the product beam.

16. The optical parametric oscillator of claim 1, wherein the optical element is placed between the non-linear crystal and the grating.

17. The optical parametric oscillator of claim 1, wherein the grating has grating lines substantially orthogonal to the extraordinary plane.

18. An optical parametric oscillator comprising:

a Littrow-mounted grating serving as a mirror and a partially transmitting mirror forming an optical cavity therebetween;

a non-linear optical crystal having an extraordinary plane, said non-linear crystal located in the optical cavity and adapted to generate a product beam of ordinary polarization in response to a pump beam of extraordinary polarization, said product beam having a different wavelength from the pump beam; and an optical element in the optical cavity adapted to rotate the polarization of the product beam from the ordinary polarization, wherein the Littrow-mounted grating is aligned so that the dispersion plane of the grating is not orthogonal to the extraordinary plane of the non-linear crystal, wherein the optical cavity is aligned such that the pump beam and product beam are non-collinear.

19. The optical parametric oscillator of claim 18, further comprising mirrors in the optical cavity that are substantially reflective for the pump beam wavelengths and substantially transmissive for the product beam wavelength.

20. The optical parametric oscillator of claim 19, wherein said mirrors are arranged such that the pump beam is 0.5° to 3.0° off of the extraordinary plane of the non-linear crystal.

21. The optical parametric oscillator of claim 20, wherein the Littrow-mounted grating is aligned so that the dispersion plane of the grating is substantially coplanar with the extraordinary plane of the non-linear crystal.

22. The optical parametric oscillator of claim 21, wherein the optical element in the optical cavity is adapted to rotate the polarization vector of the product beam from the ordinary polarization to substantially the extraordinary crystal polarization plane.

23. The optical parametric oscillator of claim 18, wherein said Littrow-mounted grating is a Littrow prism.

24. The optical parametric oscillator of claim 18, wherein said Littrow-mounted grating disperses the product beams into different orders, and wherein the Littrow-mounted grating is arranged to feed back one of the orders to the non-linear crystal.

25. The optical parametric oscillator of claim 18, wherein the non-linear crystal is cut for the TYPE I interaction.

26. The optical parametric oscillator of claim 18, wherein the non-linear crystal has a narrow acceptance angle in the extraordinary plane.

27. The optical parametric oscillator of claim 26, wherein the non-linear crystal is a BBO crystal.

28. A method of forming a narrow linewidth beam with a non-linear crystal having an extraordinary plane comprising the steps of:

amplifying in said non-linear crystal a beam such that an amplified light cone is substantially narrower in the extraordinary plane of the non-linear crystal, said beam having an ordinary polarization, said amplifying step using a pump beam that is non-collinear to said beam;

rotating the polarization of the beam from the ordinary polarization; and dispersing said beam with a grating along a dispersion plane which is not orthogonal to the extraordinary plane of the non-linear crystal.

29. The method of claim 28, wherein said non-linear crystal has a narrow acceptance angle in the extraordinary plane and wherein said amplifying step comprises pumping the non-linear crystal with a pump beam of extraordinary polarization.

30. The method of claim 29, wherein the non-linear crystal is pumped with two passes of the pump beam.

31. The method of claim 28, further comprising feeding back a portion of the beam into the non-linear crystal.

32. The method of claim 31, further comprising rotating the polarization of the feedback beam into the ordinary polarization before the feedback beam re-enters the non-linear crystal.

33. The method of claim 28, wherein said dispersing step comprises dispersing along a dispersion plane substantially coplanar with the extraordinary plane of the non-linear crystal.

34. The method of claim 28, wherein said rotating step comprises rotating the polarization vector of the beam from the ordinary polarization to substantially the extraordinary crystal polarization plane.

35. A method of forming a narrow linewidth beam with a non-linear crystal having an extraordinary plane comprising the steps of:

generating a beam of ordinary polarization in a non-linear optical crystal from a pump beam of extraordinary polarization, said beam having a different wavelength from and is non-collinear to the pump beam;

dispersing said beam with a grating along a dispersion plane which is substantially coplanar to the extraordinary plane of the non-linear crystal; and returning a portion of the beam to the non-linear crystal.

36. The method of claim 35, further comprising rotating the polarization of the beam so that the beam has a polarization perpendicular to grooves of the grating.

\* \* \* \* \*